US009727384B2

(12) United States Patent
Zarkesh

(10) Patent No.: US 9,727,384 B2
(45) Date of Patent: Aug. 8, 2017

(54) METHOD AND SYSTEM FOR CLOUD COMPUTING SERVICES FOR USE WITH CLIENT DEVICES HAVING MEMORY CARDS

(75) Inventor: Amir Masoud Zarkesh, Saratoga, CA (US)

(73) Assignee: Satellite Technologies, LLC, Minneapolis, MN (US)

( * ) Notice: Subject to any disclaimer, the term of this patent is extended or adjusted under 35 U.S.C. 154(b) by 124 days.

(21) Appl. No.: 12/948,340

(22) Filed: Nov. 17, 2010

(65) Prior Publication Data
US 2011/0119364 A1    May 19, 2011

Related U.S. Application Data

(60) Provisional application No. 61/262,520, filed on Nov. 18, 2009.

(51) Int. Cl.
G06F 9/50    (2006.01)
G06F 21/10   (2013.01)
H04L 29/06   (2006.01)
H04L 29/08   (2006.01)

(52) U.S. Cl.
CPC ............ *G06F 9/5072* (2013.01); *G06F 21/10* (2013.01); *H04L 67/10* (2013.01); *H04L 69/04* (2013.01);
(Continued)

(58) Field of Classification Search
CPC . H04L 12/4633; H04L 29/06; H04L 65/4084; H04L 67/2823; H04L 69/329;
(Continued)

(56) References Cited

U.S. PATENT DOCUMENTS 5,293,424 A * 3/1994 Holtey et al. ................. 713/193
5,987,506 A * 11/1999 Carter et al. .................. 709/213
(Continued)

FOREIGN PATENT DOCUMENTS

JP    2000253108 A    9/2000
JP    2001078166 A    3/2001
(Continued)

OTHER PUBLICATIONS

ISR and Written Opinion for PCT Application No. WO11062994, Jun. 27, 2011.

*Primary Examiner* — Alpus H Hsu
*Assistant Examiner* — Dharmesh Patel
(74) *Attorney, Agent, or Firm* — Carlos R. Villamar; The Villamar Firm PLLC

(57) ABSTRACT

A system, method and computer program product for cloud computing, including a cloud server including a cloud link module or program and coupled to a communications network; a client device including a device link module or program and coupled to the cloud server via the communications network; and a memory card including a card link module or program and coupled to the client device. The cloud link, client link, and card link modules or programs are configured to allocate processing of content between the cloud server, client device and memory card, such that communications bandwidth usage between the cloud server and the client device are minimized during content delivery.

13 Claims, 2 Drawing Sheets

(52) U.S. Cl.
CPC ...... *G06F 9/5094* (2013.01); *G06F 2209/509* (2013.01); *Y02B 60/142* (2013.01)

(58) Field of Classification Search
CPC .............. H04N 21/2343; G06F 9/5044; G06F 11/1092; G06F 12/0815; G06F 12/0875; H03M 13/09; H03M 13/15; H03M 13/16; H03M 13/23; H03M 13/1515
USPC .......................................................... 709/223
See application file for complete search history.

(56) References Cited

U.S. PATENT DOCUMENTS

| | | | |
|---|---|---|---|
| 6,668,246 B1 | 12/2003 | Yeung et al. | |
| 7,356,575 B1* | 4/2008 | Shapiro | 709/220 |
| 7,373,422 B1 | 5/2008 | Paul et al. | |
| 8,239,538 B2* | 8/2012 | Zhang et al. | 709/226 |
| 2003/0108205 A1 | 6/2003 | Joyner et al. | |
| 2004/0010621 A1 | 1/2004 | Afergan et al. | |
| 2007/0030178 A1* | 2/2007 | Lee et al. | 341/50 |
| 2007/0047659 A1* | 3/2007 | Aleksic | 375/240.25 |
| 2009/0119678 A1 | 5/2009 | Shih et al. | |
| 2009/0204964 A1 | 8/2009 | Foley et al. | |
| 2009/0228967 A1 | 9/2009 | Gbadegesin et al. | |
| 2010/0306524 A1* | 12/2010 | Runkis et al. | 713/150 |
| 2011/0078303 A1* | 3/2011 | Li et al. | 709/224 |
| 2011/0106962 A1* | 5/2011 | Cook et al. | 709/231 |

FOREIGN PATENT DOCUMENTS

| | | |
|---|---|---|
| JP | 2006074728 A | 3/2006 |
| JP | 2007215149 A | 8/2007 |
| WO | WO2009137206 A2 | 11/2009 |

* cited by examiner

METHOD AND SYSTEM FOR CLOUD COMPUTING SERVICES FOR USE WITH CLIENT DEVICES HAVING MEMORY CARDS

CROSS REFERENCE TO RELATED DOCUMENTS

The present invention claims benefit of priority to U.S. Provisional Patent Application Ser. No. 61/262,520 of Amir Masoud Zarkesh, entitled "CLOUD SERVICES CARD SIDELOADING CLIENT DEVICES," filed on Nov. 18, 2009, the entire disclosure of which is hereby incorporated by reference herein.

BACKGROUND OF THE INVENTION

Field of the Invention

The present invention generally relates to systems and methods for cloud computing or virtualized severs, and more particularly to systems and methods for cloud computing services for use with client devices having memory cards, and the like.

Discussion of the Background

In recent years, cloud computing systems and methods have been employed for the provisioning of dynamically scalable and often virtualized computing resources that can be allocated as a service over a data communication network, such as the Internet, and the like. Such cloud computing systems and methods can be configured for Software as a Service (SaaS), Platform as a Service (PaaS), Infrastructure as a Service (IaaS), and the like, services, which can fall under the umbrella of cloud computing.

However, even with such cloud computing systems and methods, there is still a need for cloud computing services that can be used with client devices having memory cards for providing robustness and efficiency to such cloud computing systems and methods.

SUMMARY OF THE INVENTION

Therefore, there is a need for a method and system that address the above and other problems with cloud computing systems and methods. The above and other needs are addressed by the illustrative embodiments of the present invention, which provide a novel method and system for cloud computing services for use with client devices having memory cards, and the like.

Accordingly, in an illustrative aspect, there is provided a system, method and computer program product for cloud computing, including a cloud server including a cloud link module or program and coupled to a communications network; a client device including a device link module or program and coupled to the cloud server via the communications network; and a memory card including a card link module or program and coupled to the client device. The cloud link, client link, and card link modules or programs are configured to allocate processing of content between the cloud server, client device and memory card, such that communications bandwidth usage between the cloud server and the client device are minimized during content delivery.

The cloud server can include a plurality or cloud servers or virtualized computers.

Based on the allocation by the cloud link, client link, and card link modules or programs, the cloud server can perform transcoding on the content to a higher compression, the memory card can perform transcoding of the higher compressed content to a lower compression so the lower compressed content can be used by the client device, and the client device can perform decompression of the transcoded content.

The content can include video and/or audio files.

The memory card can include a standard memory interface.

The memory card can include a microcontroller, microprocessor, application processor, and/or programmable processor configured to execute the card link module or program.

Still other aspects, features, and advantages of the present invention are readily apparent from the following detailed description, simply by illustrating a number of illustrative embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings, in which like reference numerals refer to similar elements, and in which.

DETAILED DESCRIPTION OF THE PREFERRED EMBODIMENTS

Figure 1:
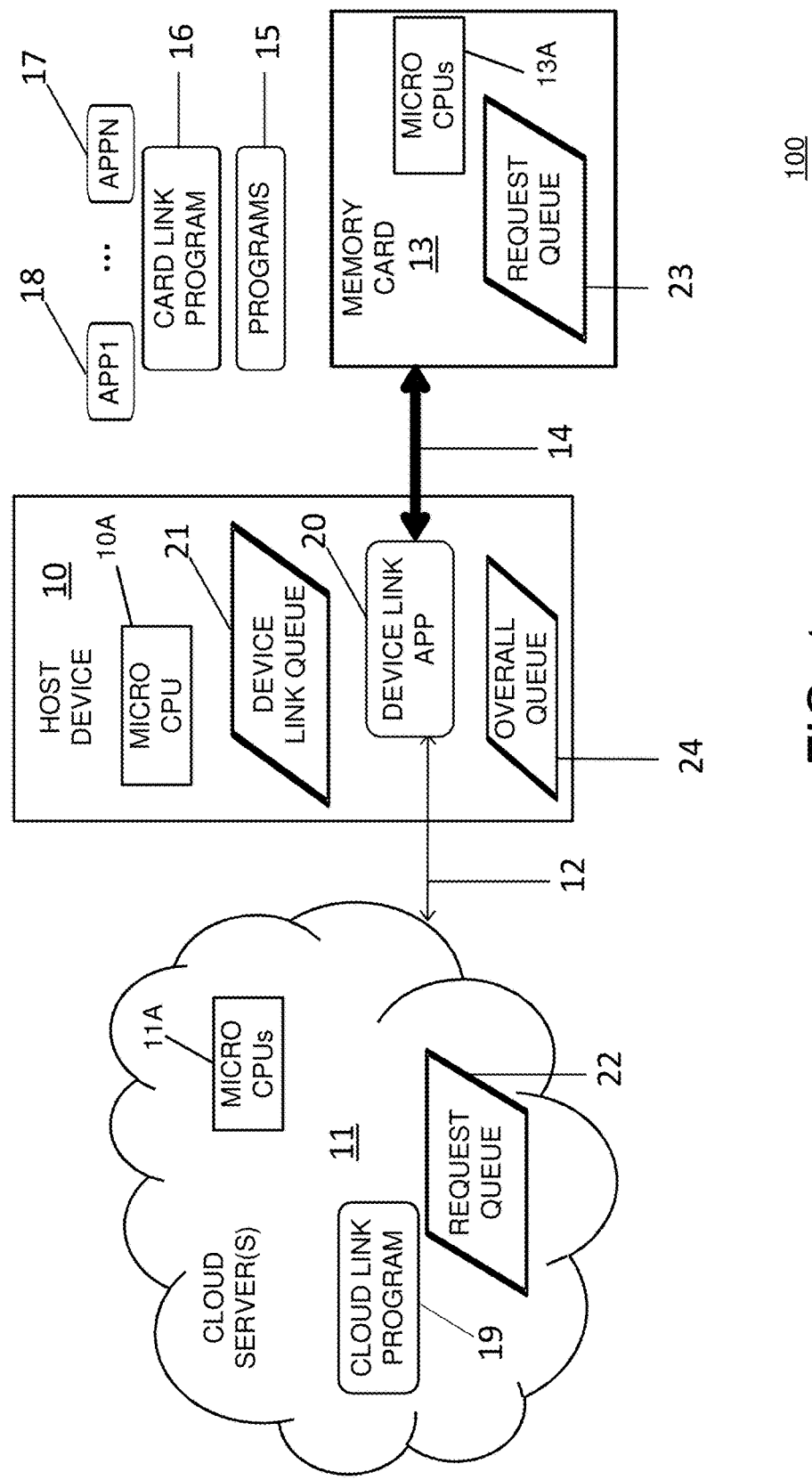
FIG. 1 is an illustrative system and method for cloud computing services cards for use with client devices having memory cards.

The present invention includes recognition that cloud computing services can and do often provide business and personal applications online that are accessed from a web browser in a client device, while the software and data are stored on one or more cloud servers. The cloud servers can be connected and distributed in one or many different geographical location(s), and can be referred to as the "cloud." The cloud is often run under virtualization software that enables running many applications on virtualized computers, which can appear as many separate computers that can run on a same server. Virtualization software need not be employed on the cloud, but it does represent an optimized utilization of the computing, communication, and storage resources of the cloud servers.

The capability to run software applications as a service on Internet-connected consumer electronics devices is highly desirable for consumers. Each application on a client device can employ (1) internet connection bandwidth, (2) processor computational power, and (3) local memory and/or storage, in order to be able to download and run part or all of the applications that are targeted for the client in a cloud computing services system.

Variations in the values of the above client device parameters affect the experience of the user running the cloud software applications and/or services and can be manifested in the form of application or service latencies. Client latency can be characterized as the delay or time between any two significant events in the process of running an application or service on a client device (e.g., the time between the start of a download of an application until the download of an initial part of the application is performed, the time between the start of an application on the client device and a first processed, viewed, or detected result of the application, etc.). Similarly, each application or service has a certain set of maximum latencies associated with an acceptable level of user experience quality. If one or more of these client device latencies in running the application or service exceed an acceptable level, the user experience can be degraded and become unacceptable.

A fundamental theorem of information theory, known as Shannon's Theorem, as the backbone of the communication systems technology, establishes that however contaminated with noise interference a communication channel may be, it is still possible to communicate digital data (e.g., content, information, data, etc.) nearly error-free up to a given maximum rate through the channel. This theoretical maximum for information transfer rate of a channel for a particular noise level, is referred to as the capacity of a communication channel, and can be reached, for example, via suitable source and channel encoding and decoding. The present invention includes recognition that a direct consequence of Shannon's Theorem is that no matter how much processing power and storage may be available on the cloud server side, these servers will not be able to effectively provide their services and applications unless a commensurate (e.g., ideal) or minimum (e.g., practical) level of processing and storage is also available on the client device side. In other words, a relatively rich set of cloud services and applications can be provided to client devices through cloud servers, advantageously, if there is a partitioning of the processing and storage of the services and applications, such that some minimum level of the processing and storage is kept available or reserved for cloud applications on the client device side. This is because communications can become a most costly part of a cloud system if all or most of the application and/or services are run on the cloud, which as a result consumes a higher amount communications bandwidth. The present invention includes recognition that given the availability of such minimum processing and storage capabilities on the client device side, the software application and services can be partitioned between cloud servers and the client devices, such that even with the limited bandwidth of the communication channel between the cloud servers and the client devices, cloud application or service latencies and/or the cost of communications between the cloud and client can be acceptable to the user.

Applications of the above fundamental theorem in communication systems that employ some significant minimum processing on the client device side can include video/audio delivery, Internet browsing, and the like. In the case of video and audio delivery, if a non-encoded signal is sent from the cloud servers to the client device, relatively very little local processing need be employed on the client device side. However, this requires significant bandwidth to transfer the non-encoded video and audio, which is not practical due to the practical limited bandwidth of communication channels and the relative high usage cost thereof. Therefore, it is much cheaper to include decoders on the client device side and send encoded video and audio through the communication channel. Another example is Internet browsing, which is turning out to be a main venue for interfacing applications in many devices, including video and audio delivery, and the like. There are advantages in taking care of browsing tasks on the cloud server side, especially since there are many plug-ins, and the like, devices that enable significant user experience enhancements with the cost of significant processing (e.g., such as with Adobe Flash Player). Once again, doing all the Internet Browsing tasks on the cloud servers and sending fully rendered images to the client device reduces the processing and storage requirements on the client device side, but causes a high cost with respect to the communication channel usage, or due to the limit of the channel bandwidth causes a relatively low quality user experience due to the relatively high latency in providing the fully rendered images to the client device at a fast enough pace. The same problem can occur if multimedia files are played in an application on the client device rather than on a web browser.

In the case of the personal computers (PC), laptops, and the like, connected to data or voice networks, and the like, there exist very few widely accepted sets of central processing units (CPUs) and associated architectures (e.g., a very widely used example being processors based on the Intel® architecture). At the same time, such client devices have sufficient amounts of storage (e.g., relatively large hard disks), memory (e.g., RAM), and reliable bandwidth (e.g., via Cable or DSL, etc.) that can support a broad set of applications, whether these are applications that are downloaded from the cloud and run in their entirety on the client, or applications that are run partly on the client and are partly served by the cloud.

However, the present invention includes recognition that in the case of newer categories of consumer electronics devices, there is no standard processor and associated architecture, which dominates the market. One example is the category of mobile cell phone handsets, wherein even cell phones manufactured by a single commercial company (e.g., Nokia®, Motorola®, etc.) often use different processors and software operating systems for different models, and have widely varying features and set of capabilities. Moreover, the present invention includes recognition that there are many different types and versions of operating systems, and that various amounts of storage are available in different cell phones and within different cell phone models. As a result, each application, whether stand-alone or running on the cloud, needs to be ported to different processors in order to enable the application to be run on the different handsets. Moreover, many handsets may not have the capability to run an application that requires higher computing power than that which is natively available. Therefore, even though many consumer electronics devices, such as handsets, hand held devices, and the like, increasingly have fast Internet connections, not all of them are capable enough to run many of the available applications. Even if such devices are capable enough, they may need different ported binaries (e.g., compiled source code) to match their processors and architectures. The present invention includes recognition that such heavy "fragmentation" of processors, architectures, operating systems, available storage, reliable bandwidth for Internet connections, and the like, in consumer electronics devices, such as mobile cell phones, hand held devices, and the like, has resulted in significant costs for content or software/service providers, and represents a very disadvantageous state of affairs for the average consumer and providers of software applications and services. One solution for the above challenges is to run more of the application in the cloud. However, this solution poses the problem of a higher relative cost and latency due to the relatively higher amount of communications between the cloud servers and the client devices.

The present invention includes recognition that the problems discussed above cause inefficiencies for many entities in the ecosystem of delivery of applications and services for handsets and consumer electronics devices, for example, including application developers who incur a high cost in porting their applications to a variety of processors for a wide spectrum of devices, if they wish to cover a significant portion/sector of the market; consumers who are limited in their access to only part of the available applications and services on the market, e.g., those that work with their specific device (e.g., applications or "apps" which can only be run on the Apple® iPhone® platform, etc.); and cloud service and content providers who have access to only part of the devices in the market that have the requisite minimum requirements, and to which they have ported their services and applications.

Within the category of fragmented consumer electronics devices described above, the only practical and successful offering to consumers so far has been a vertical "integrated" solution, behind what is referred to in the industry as a "walled garden" (e.g., a closed set or exclusive set of information services provided for users). Such a vertical solution typically involves a single company and a set of partner companies providing (a) the actual consumer electronics device (e.g., with a specific processor), (b) approved applications running on such specific processor, and (c) an Internet site or exclusive online delivery mechanism to download new applications by the consumers of the specific type of consumer electronics device in (a). For example, in the mobile handset market, Apple has provided such a solution by providing the iPhone and the Apple App Store. Other players, such as Google are promoting another in-house developed operating system, Android, and provide a site for downloading applications that work on phones running Android. Such a vertical offering by Google is limited only to phones running Android on respective processors, and provides a single source for application distribution and download.

Advantageously, the present invention leverages the very few external memory standards that are common between a majority of handsets and consumer electronics devices, personal computers, laptops, netbooks, and the like. For example, most of such devices have one or more slots to connect to external storage devices through memory standards, such as SD, USB, and the like, interfaces. Such cards can included Compact Flash cards, Smart Media cards, MultiMedia Cards, Secure Digital (SD) cards, microSD cards, miniSD cards, SDHC cards, miniSDSC cards, memory sticks, USB sticks or flash drives, xD cards, cards with both processing and storage elements, and the like.

Generally, the present invention can include illustrative methods and systems that employ an accessory memory card, with a standard memory interface, that includes at least some memory and at least one processor, to connect as a slave to a variety of host devices through the standard memory interface, where the host devices are connected via the Internet, other data networks, and the like, at least for some fraction of a time, to a central application and/or services server, e.g., a cloud server of a cloud, to enable the host devices to be placed under the control of the cloud and receive and process delivery of cloud services, applications, and the like.

The illustrative method and system can include a computer program or module running on the cloud servers of a cloud (e.g., called a cloud link program or module), a computer program or module running on the host device (e.g., called a device link program or module), and a computer program or module running on the accessory memory card (e.g., a sideloaded memory card, called a card link program or module). Advantageously, the illustrative methods and systems enable the processing and storage on the accessory card to act as a cache for the cloud servers, since the accessory card and the host device are connected to each other relatively more often, and since the communication link therebetween has a relatively higher data rate than the communication link between the cloud servers and the host device. Therefore, a cloud application and/or service can be run by partly running such application and/or service on the memory card, and partly on the cloud servers. The present invention allows for extension of cloud applications and/or services from the cloud servers to the memory cards, advantageously, considering the fact that in many cases the memory cards and the cloud servers are both acting as slaves with the host device acting as the master (e.g., the communications between the host device and cloud servers, and between the memory card and the host device can be initiated only by the host device).

Advantageously, with the illustrative methods and systems, the respective device link programs or modules manage request queues of the cloud servers, memory cards, and host devices, so as enable the delivery of applications and/or services to the client host devices. The processing and storage of the memory card can be configured take care of the employed resources on the client device side for a providing relatively higher quality cloud services and/or application delivery at a relatively lower cost, and in a uniform manner. Advantageously, with such local processing and storage resources, the cloud services and/or applications can be partitioned between the cloud servers, the host devices, and the accessory memory cards. Advantageous examples of tasks that can be run on the accessory memory cards can include video and/or audio decoding, transcoding, image rendering, compression, encryption, decryption, and the like.

Referring now to the drawings, FIG. 1 is an illustrative system and method for cloud services cards for use with client devices. In FIG. 1, the system and method 100 can include an electronic client host device 10 having a microprocessor 10A (e.g., such as a cell phone, a consumer electronics device, etc.), and with a connection mechanism or link 12 (e.g., through the Internet or other data network, etc.) to a cloud server or servers 11 having one or more microprocessors 11A that run a cloud link program 19 to serve the client host device 10. The client host device 10 may not have enough processing and/or storage in a form useful for the cloud servers 11. The client host device 10, for example, can include cell phones, personal digital assistants, televisions, set-top boxes, digital video recorders, home entertainment systems, appliances, personal computers, laptops, netbooks, other consumer electronic devices, and the like. A memory card 13 having one or more microprocessors and/or microcontrollers 13A (e.g., a sideloaded memory card) is connected to the host device 10 through an interface 14 (e.g., a standard memory interface) and is used to load the employed processing and/or storage, advantageously, to enable the corresponding cloud services that employ such local processing and storage local to the host device 10. The memory card 13, for example, can include Compact Flash cards, Smart Media cards, MultiMedia Cards, Secure Digital (SD) cards, microSD cards, miniSD cards, SDHC cards, miniSDSC cards, memory sticks, USB sticks or flash drives, xD cards, other similar standard or non-standard memory cards with additional processing capabilities, and the like. The memory card 13 can run programs 15, such a hardware abstraction layer, an operating system, a set of drivers, and the like, to enable suitable card link programming on the memory card 13. Accordingly, the memory card 13 can run a card link program 16 that enables communications between the memory card 13, the host device 10, and cloud servers 11. The memory card 13 can also run one or more applications 17 and 18 and other similar applications and/or services at the same or different times. The cloud servers 11 usually want to work with many different types of host devices 10 having processing and storage that can be very different and fragmented between such devices. Accordingly, employing the uniform memory card 13 connected via the standard interface 14 to a variety of the host devices 10, enables the cloud servers 11 to have access to uniform processing and/storage local to a variety of the host devices 10.

In an illustrative embodiment, the interface 14 has a higher speed connection than the interface or link 12, and as a result the host device 10 can benefit from the cached processing and/or storage in the memory card 13, relative to the processing and/or storage on the cloud servers 11. An application and/or service provided by cloud servers 11 can be delivered to the host device 10 under acceptable latency even with the relatively high latency of the connection 12, if the application and/or service are appropriately partitioned between the cloud servers 11, and the local processing in the host device 10. However, due to the lack of availability of uniform processing and/or storage in different types of the host devices 10, local uniform processing and/or storage can be provided, advantageously, through the higher speed interface 14 to the memory card 13 having such uniform processing and/or storage and one or more processors 13A and one or more memory and/or storage elements therewithin. Thus, the memory card 13 and the cloud servers 11 can be configured as slaves in communications with the host device 10 that acts as the master, such that communications through interface 12 and interface 14 are possible when the host device 10 initiates such communications. Accordingly, a device link computer program or module 20 running on the host device 10 enables communications between cloud servers 11 running a cloud link computer program or module 19, and the memory card 13 running a card link computer program or module 16. Requests queues can also be employed to process requests between the cloud servers 11, the host device 10, and the memory card 13, for example, including a cloud link request queue 22, a card link request queue 23, a device link request queue 21, and an overall link request queue 24. The cloud link program or module 19 can be a part of other programs running on the cloud servers 11. Similarly, the device link program or module 20 can be a part of other programs running on the host device 10. Similarly, the card link program 16 can be a part of other programs running on the memory card 13. The device link computer program or module 20 can be written such that together with the card link program or module 16 enable cloud link computer program or module 19 to effectively act as the master for predetermined functions on both the device 10 and the memory card 13.

The cloud link request queue 22 can be filled with requests of the cloud servers 11 based on a determined priority of the cloud link program 19 and/or other programs and/or services running on the cloud servers 11. Similarly, the device link request queue 21 can be filled with requests of the host device 11 based on a determined priority of the device link program 20 and/or other programs and/or services running on the host device 10. The requests in the device link request queue 21 can include requests from users, other agents or devices, and the like, with which the host device 10 interacts, as gathered from the respective interfaces of the host device 10. Similarly, the card link request queue 23 can be filled with requests of the memory card 13 based on a determined priority of the card link program 16 and/or other programs and/or services running on the memory card 13. The overall link request queue 24 can be filled with requests of the host device 10 based on a determined priority of the device link program 20 and/or other programs and/or services running on the host device 10.

The device link program 20 can use the state of the host device 10 and all suitable signals of input and output devices of the host device 10 to determine suitable requests, with suitable priority, to submit into the device link request queue 21. Similarly, the card link program 16 can use the state of the memory card 13 and all suitable signals of input and output devices of the memory card 13 to determine suitable requests, with suitable priority to submit into the card link request queue 23. Similarly, the cloud link program 19 can use the state of the cloud servers 11 and all suitable signals of input and output devices of the cloud servers 11 to determine suitable requests, with suitable priority, to submit into the cloud link request queue 22.

Figure 2:
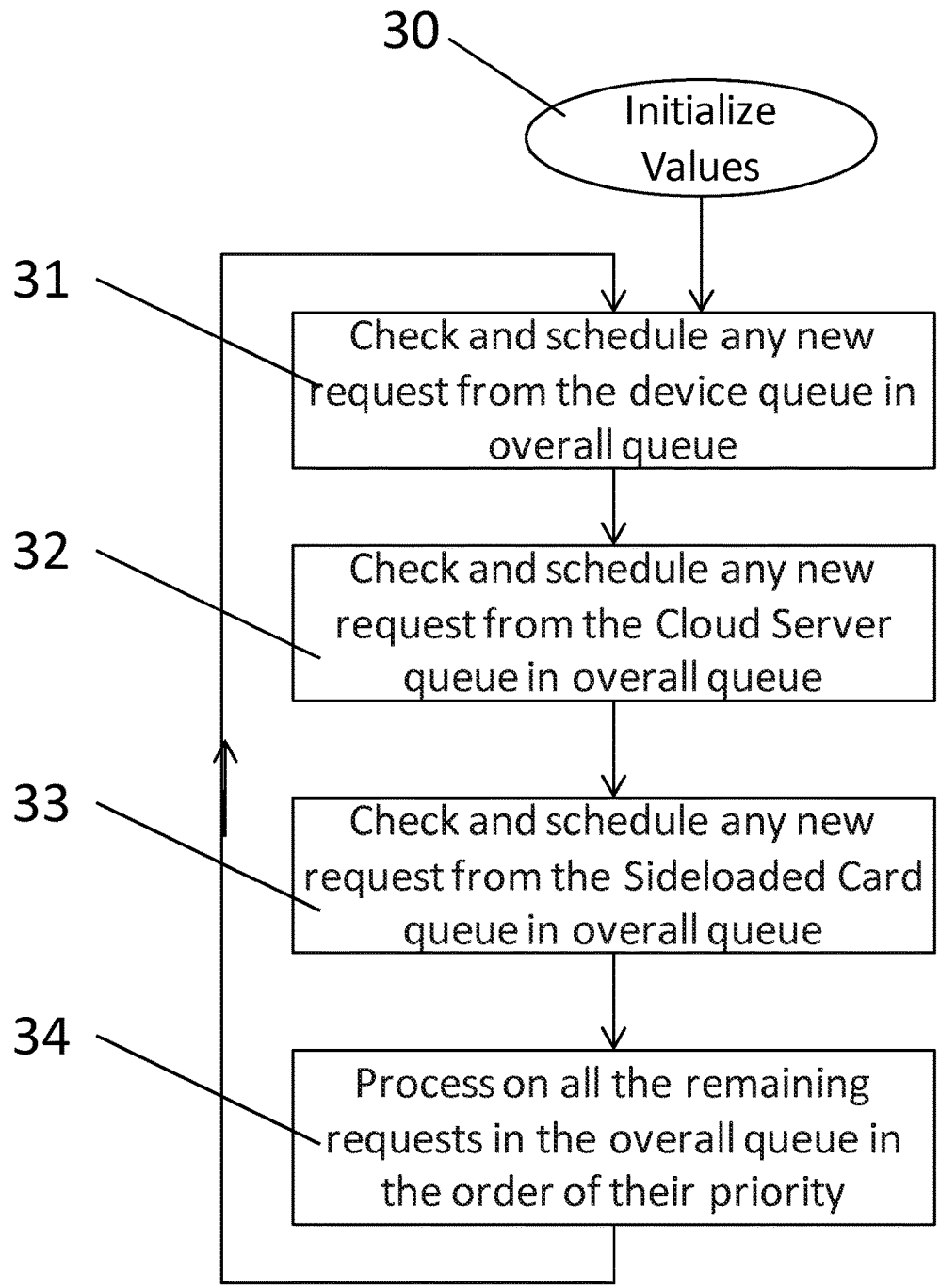
FIG. 2 is an illustrative flow chart of an illustrative device link module or program running on a host device of the illustrative system of FIG. 1.

FIG. 2 is an illustrative flow chart of an illustrative device link program running on a host device of the illustrative system of FIG. 1. In FIG. 2, the device link program or module 20 on the host device 10 is used to enable communications between the cloud servers 11, the memory card 13, and the host device 10. For example, at step 30 all suitable values and parameters are initialized, and then step 31 checks and schedules requests from the device link queue 21 and moves suitable requests into the overall link request queue 24. Step 32 checks and schedules requests from the cloud link queue 22 and moves suitable requests into the overall link request queue 24. Step 33 checks and schedules requests from the card link queue 23 and moves suitable requests into the overall link request queue 24. Step 34 processes the requests in the overall link request queue 24 in order of priority until the overall link request queue 24 is emptied. The processing of steps 31-34 then can be repeated continuously until a stop or other suitable condition is executed.

The requests in the overall link request queue 24 can include interaction with any suitable interfaces of the host device 10. The order of the steps 31-34 can be changed in any suitable way. For example, the steps 31-34 can be performed partially and in a different order until all of the steps 31-34 are completed. The priority schemes for the queues 21, 22, and 23 can be varied and determined based on any suitable priority scheme. In addition, the size of the data in each of the requests can be highly varying. For example, in most cases, the size of the data in the requests communicated between the host device 10 and the memory card 13 can be much larger than the data size of the requests communicated between the host device 10 and the cloud servers 11, due to the higher bandwidth of communication channel 14 versus the communication channel 12. The request queues need not replicate the requested data and, for example, can employ pointers, and the like, to the requested data to reduce storage bandwidth. The choice of the data for each of the requests, the specific method to store them, and the specific priority schemes for the processing of the request queues can be application dependent and can be chosen from any suitable scheme. The flowchart of FIG. 2 can be used to enable cloud servers 11 to communicate and control the slave memory card 13 processing and storage resources for the host device 10 with suitable cloud link and card link programs or modules 19 and 16, based on the flowchart of FIG. 2, respectively running on the cloud servers 11 and the memory card 13.

Advantageously, the memory card 13 with processing and/or storage is configured as a slave to the host device 10 connected, for example, via the Internet to the cloud servers 11, so as be under control of the cloud servers 11, based on the device link program 20 running on the host device 10. This is like having one of the computer racks of the cloud servers 11 to be made compact and much smaller in size, with smaller power consumption, and with lesser capabilities, configured as the memory card 13 and being connected to the client host device 11. Thus, the cloud servers 11 are provided with a predictable and controllable hardware platform via the host device link program or module 20. The host device link program or module 20 can be provided, installed and run on the host device 10 or provided on the host device 10 by the manufacturer of the host device 10.

Advantageously, part of the computational power for applications and/or services of the cloud servers 11 can be moved for local computation by the host device 10, using the memory card 13, avoiding use of a relatively high amount and/or fine grain level of communications between the host device 10 and the cloud servers 11 via the interface 12, and instead using relatively high amount and/or coarse grain level of communications between host device 10 and the memory card 13 via the interface 14. For example, the memory card 13 can be configured to run decoding, transcoding, and the like, functions to convert content from the cloud servers to a format recognizable by the host device 10 and/or for providing rendering engines on the memory card 13, and moving the rest of the applications to the cloud servers 11. The local content decoding and/or rendering performed by the memory card 13 can provide a high quality user experience without the need for back and forth communications with the cloud servers 11. Advantageously, decoding and/or transcoding of content to a simpler format understandable by the host device 10, and rendering suitable for the interfaces of the host device 10 can be performed in the memory card 13. Advantageously, this enables a variety of client devices 10 with varying build parameters and purposes to be able to be provided with a rich set of cloud applications and/or services via the memory card 13.

Advantageously, the illustrative systems and methods enable encoding of the content to be communicated from the cloud servers 11 to the host device 10 and vice versa in a compressed format which is more compressed than the host device 10 can handle and which is enabled by the processing power and storage in the memory card 13. Accordingly, a service provider can transcode content through a post-processing step into a more compressed format and send the compressed content through the communications channel 12 at relatively lower bit-rate. Then, the device link program or module 20 can pass the compressed content to the memory card 13. The memory card 13 can then process the compressed content and transcode the compressed content from the higher compression to a lower compression format that can be processed by the host device 10 and send the transcoded content to the host device 10. Similarly, content on the host device 10 that may be already compressed can be sent to the memory card 13 for decompression. The memory card 13 based on its one or more processors 13A and storage resources can transcode the compressed content to a higher compression format and send the higher compressed content to the cloud servers 11 through the memory card 13 interface 14 to the host device 10 and the communications channel 12. Advantageously, the compressed content can be communicated at a relatively lower bit-rate through the communications channel 12. Such bandwidth optimization provides an advantageous cost reduction opportunity for network operators and/or service providers by employing less bandwidth. In addition, this also can enable the sending of content through the communication channel 12 at a relatively higher quality compression for a same bit-rate. Such features are advantageous because it may take a long time for content and/or devices to adopt higher compression standards. In addition, such features enable the leveraging of relatively higher compression, even if the host device 10 and the content to be sent through the communications channel 12 have not adopted the latest high data compression format.

Advantageously, a more energy efficient mechanism for delivery of cloud applications and/or services is provided by partitioning more of the relatively high computational tasks onto a processor of the relatively low power memory card 13, when the power consumption on the memory card 13 is lower than the power consumption on the cloud servers 11 when performing such partitioned tasks. In addition, this can reduce the computational and power consumption costs on the cloud servers 11 side, since the client devices 10 covers such costs on the client device 10 side with the help of the memory card 13. With the rapid increase of computation energy costs, such computational off-loading or load balancing between the cloud servers 11 and the processing and storage in the memory card 13 can become advantageous for cloud services and/or applications providers.

The above-described devices and subsystems of the illustrative embodiments of FIGS. 1-2 can include, for example, any suitable servers, workstations, PCs, laptop computers, PDAs, Internet appliances, handheld devices, cellular telephones, wireless devices, other electronic devices, and the like, capable of performing the processes of the illustrative embodiments of FIGS. 1-2. The devices and subsystems of the illustrative embodiments of FIGS. 1-2 can communicate with each other using any suitable protocol and can be implemented using one or more programmed computer systems or devices.

One or more interface mechanisms can be used with the illustrative embodiments of FIGS. 1-2, including, for example, Internet access, telecommunications in any suitable form (e.g., voice, modem, and the like), wireless communications media, and the like. For example, employed communications networks or links can include one or more wireless communications networks, cellular communications networks, cable communications networks, satellite communications networks, G3 communications networks, Public Switched Telephone Network (PSTNs), Packet Data Networks (PDNs), the Internet, intranets, WiMax Networks, a combination thereof, and the like.

It is to be understood that the devices and subsystems of the illustrative embodiments of FIGS. 1-2 are for illustrative purposes, as many variations of the specific hardware and/or software used to implement the illustrative embodiments are possible, as will be appreciated by those skilled in the relevant art(s). For example, the functionality of one or more of the devices and subsystems of the illustrative embodiments of FIGS. 1-2 can be implemented via one or more programmed computer systems or devices.

To implement such variations as well as other variations, a single computer system can be programmed to perform the special purpose functions of one or more of the devices and subsystems of the illustrative embodiments of FIGS. 1-2. On the other hand, two or more programmed computer systems or devices can be substituted for any one of the devices and subsystems of the illustrative embodiments of FIGS. 1-2.

Accordingly, principles and advantages of distributed processing, such as redundancy, replication, and the like, also can be implemented, as desired, to increase the robustness and performance the devices and subsystems of the illustrative embodiments of FIGS. 1-2.

The devices and subsystems of the illustrative embodiments of FIGS. 1-2 can store information relating to various processes described herein. This information can be stored in one or more memories, such as a hard disk, optical disk, magneto-optical disk, RAM, and the like, of the devices and subsystems of the illustrative embodiments of FIGS. 1-2. One or more databases of the devices and subsystems of the illustrative embodiments of FIGS. 1-2 can store the information used to implement the illustrative embodiments of the present invention. The databases can be organized using data structures (e.g., records, tables, arrays, fields, graphs, trees, lists, and the like) included in one or more memories or storage devices listed herein. The processes described with respect to the illustrative embodiments of FIGS. 1-2 can include appropriate data structures for storing data collected and/or generated by the processes of the devices and subsystems of the illustrative embodiments of FIGS. 1-2 in one or more databases thereof.

All or a portion of the devices and subsystems of the illustrative embodiments of FIGS. 1-2 can be conveniently implemented using one or more general purpose computer systems, microprocessors, digital signal processors, microcontrollers, application processors, domain specific processors, application specific signal processors, and the like, programmed according to the teachings of the illustrative embodiments of the present invention, as will be appreciated by those skilled in the computer and software arts. Appropriate software can be readily prepared by programmers of ordinary skill based on the teachings of the illustrative embodiments, as will be appreciated by those skilled in the software art. In addition, the devices and subsystems of the illustrative embodiments of FIGS. 1-2 can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry and/or software.

Stored on any one or on a combination of computer readable media, the illustrative embodiments of the present invention can include software for controlling the devices and subsystems of the illustrative embodiments of FIGS. 1-2, for driving the devices and subsystems of the illustrative embodiments of FIGS. 1-2, for enabling the devices and subsystems of the illustrative embodiments of FIGS. 1-2 to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementing the illustrative embodiments of FIGS. 1-2. Computer code devices of the illustrative embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present invention can be distributed for better performance, reliability, cost, and the like.

As stated above, the devices and subsystems of the illustrative embodiments of FIGS. 1-2 can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

While the present invention have been described in connection with a number of illustrative embodiments and implementations, the present invention is not so limited, but rather covers various modifications and equivalent arrangements, which fall within the purview of the appended claims.

What is claimed is:

1. A computer implemented system for cloud computing, the system comprising:

a cloud server including a cloud link module and coupled to a communications network;

a client device including a device link module and coupled to the cloud server via the communications network; and a memory card including a card link module and coupled to the client device, wherein the cloud link module, the device link module, and the card link module are configured to allocate processing of content between the cloud server, client device and memory card, such that communications bandwidth usage between the cloud server and the client device are minimized during content delivery, wherein based on the allocation by the cloud link module, the device link module, and the card link module, the cloud server is configured to perform transcoding on the content to produce first compressed content and provide the first compressed content to the client device, the memory card is configured to obtain the first compressed content from the client device and to perform transcoding of the first compressed content to produce second compressed content having lower compression than the first compressed content, and the client device is configured to obtain the second compressed content from the memory card and to perform decompression of the second compressed content, wherein the memory card includes at least one of a microcontroller, microprocessor, application processor, and programmable processor integrated therein and configured to execute a card link program, wherein the client device is configured to act as a master and to initiate communications between the client device and the cloud server and between the client device and the memory card, wherein the cloud server and the memory card are configured to act as slaves, wherein based on the allocation by the cloud link, device link, and card link modules, over a standard interface to the memory card, the memory card is configured to perform decryption and encryption of the content so that decrypted content can be rendered in the card link program as an image or video of the content and used by the client device including a resource constrained mobile phone device, and wherein the rendered image or video file is transmitted from the card link program and displayed by the resource constrained mobile phone device.

2. The system of claim 1, wherein the cloud server comprises a plurality of cloud servers or virtualized computers.

3. The system of claim 1, wherein the memory card is further configured to obtain from the client device third compressed content, to transcode the third compressed content to produce fourth compressed content having higher compression than the third compressed content, and wherein the client device is further configured to send the fourth compressed content to the cloud server.

4. The system of claim 1, wherein the first compressed content is compressed with a first compression format and the second compressed content is compressed with a second compression format.

5. The system of claim 4, wherein the client device does not support the first compression format.

6. A method for cloud computing, the method comprising:
providing in a cloud server coupled to a communications network, a cloud link module;
providing in a client device coupled to the cloud server via the communications network, a device link module;
providing in a memory card coupled to the client device, a card link module;
allocating processing of content between the cloud server, client device and memory card via the cloud link module, the device link module, and the card link module, such that communications bandwidth usage between the cloud server and the client device are minimized during content delivery; and
based on the allocation by the cloud link module, the device link module, and the card link module, performing by the cloud server transcoding on the content to produce first compressed content and provide the compressed content to the client device, obtaining by the memory card the first compressed content from the client device, performing by the memory card transcoding of the first compressed content to produce second compressed content having lower compression than the first compressed content, obtaining the second compressed content by the client device from the memory card, and performing by the client device decompression of the second compressed content,
wherein the memory card includes at least one of a microcontroller, microprocessor, application processor, and programmable processor integrated therein and configured to execute a card link program, wherein the client device is configured to act as a master and to initiate communications between the client device and the cloud server and between the client device and the memory card, wherein the cloud server and the memory card are configured to act as slaves, and wherein based on the allocation by the cloud link, device link, and card link modules, over a standard interface to the memory card, the memory card is configured to perform decryption and encryption of the content so that decrypted content can be rendered in the card link program as an image or video of the content and used by the client device including a resource constrained mobile phone device, and wherein the rendered image or video file is transmitted from the card link program and displayed by the resource constrained mobile phone device.

7. The method of claim 6, wherein the cloud server comprises a plurality of cloud servers or virtualized computers.

8. The method of claim 6, wherein the first compressed content is compressed with a first compression format and the second compressed content is compressed with a second compression format.

9. The method of claim 8, wherein the client device does not support the first compression format.

10. A computer program product for cloud computing, and including one or more computer readable instructions embedded on a tangible, non-transitory computer readable medium and configured to cause one or more computer processors to perform the steps of:
providing in a cloud server coupled to a communications network, a cloud link module;
providing in a client device coupled to the cloud server via the communications network, a device link module;
providing in a memory card coupled to the client device, a card link module;
allocating processing of content between the cloud server, client device and memory card via the cloud link module, the device link module, and the card link module, such that communications bandwidth usage between the cloud server and the client device are minimized during content delivery; and
based on the allocation by the cloud link module, the device link module, and the card link module, performing by the cloud server transcoding on the content to produce first compressed content and provide the compressed content to the client device, obtaining by the memory card the first compressed content from the client device, performing by the memory card transcoding of the first compressed content to produce second compressed content, obtaining the second compressed content by the client device from the memory card, and performing by the client device decompression of the second compressed content,
wherein the memory card includes at least one of a microcontroller, microprocessor, application processor, and programmable processor integrated therein and configured to execute a card link program, wherein the client device is configured to act as a master and to initiate communications between the client device and the cloud server and between the client device and the memory card, wherein the cloud server and the memory card are configured to act as slaves, and wherein based on the allocation by the cloud link, device link, and card link modules, over a standard interface to the memory card, the memory card is configured to perform decryption and encryption of the content so that decrypted content can be rendered in the card link program as an image or video of the content and used by the client device including a resource constrained mobile phone device, and wherein the rendered image or video file is transmitted from the card link program and displayed by the resource constrained mobile phone device.

11. The computer program product of claim 10, wherein the cloud server comprises a plurality of cloud servers or virtualized computers.

12. The computer program product of claim 10, wherein the first compressed content is compressed with a first compression format and the second compressed content is compressed with a second compression format.

13. The computer program product of claim 12, wherein the client device does not support the first compression format.

* * * * *